US00RE44740E

(19) United States
(12) Reissued Patent
Ciungan

(10) Patent Number: US RE44,740 E
(45) Date of Reissued Patent: Feb. 4, 2014

(54) ARTICULATING MOUNT

(75) Inventor: Marcel Ciungan, Arlington Heights, IL (US)

(73) Assignee: Peerless Industries, Inc., Melrose Park, IL (US)

(21) Appl. No.: 29/351,760

(22) Filed: Dec. 10, 2009

Related U.S. Patent Documents

Reissue of:
(64) Patent No.: Des. 558,560
Issued: Jan. 1, 2008
Appl. No.: 29/263,478
Filed: Jul. 24, 2006

(51) LOC (10) Cl. ..... 08-51
(52) U.S. Cl.
USPC ..... D8/363; D14/452
(58) Field of Classification Search
USPC ..... D8/349, 354, 363; D14/451, 452, 433, D14/375; 248/274.1, 284.1, 278.1, 586, 593
See application file for complete search history.

(56) References Cited

U.S. PATENT DOCUMENTS 4,470,106 A * 9/1984 Norton ..... 362/398
5,201,896 A * 4/1993 Kruszewski ..... 248/278.1

(Continued)

*Primary Examiner* — Phillip S Hyder
(74) *Attorney, Agent, or Firm* — Foley & Lardner LLP

(57) CLAIM

I claim the ornamental design for [a] *an* articulating mount, as shown and described.

DESCRIPTION

Figure 3:
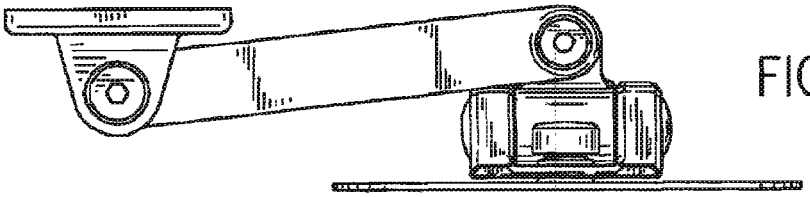
Figure 4:
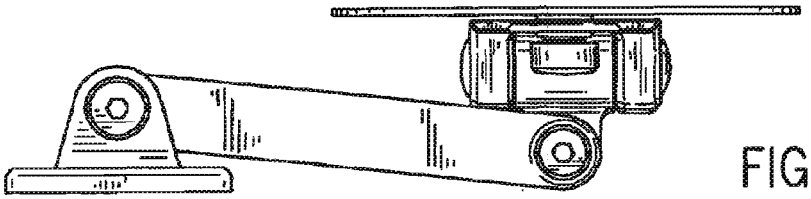
Figure 5:
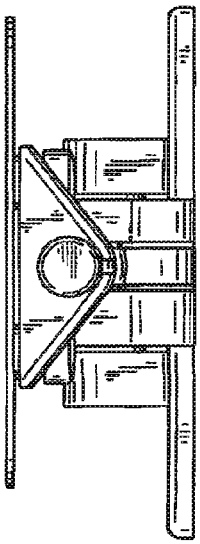
Figure 6:
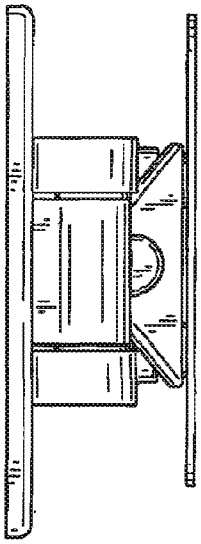
Figure 7:
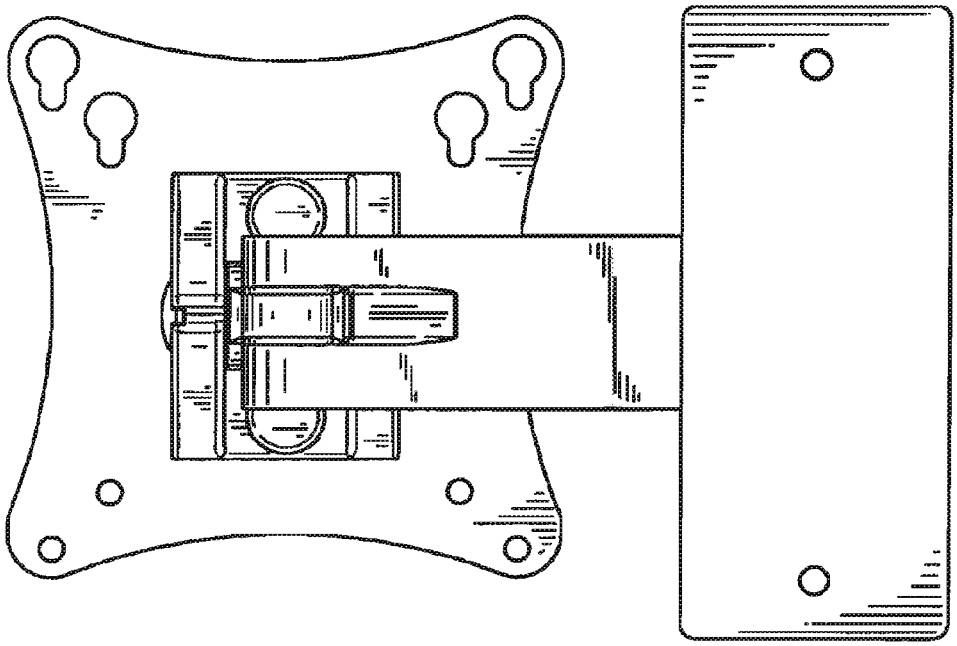
Figure 11:
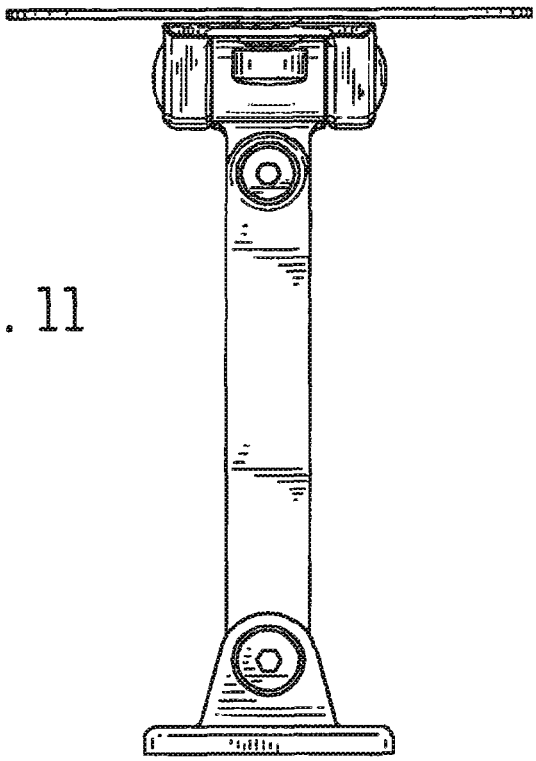
Figure 12:
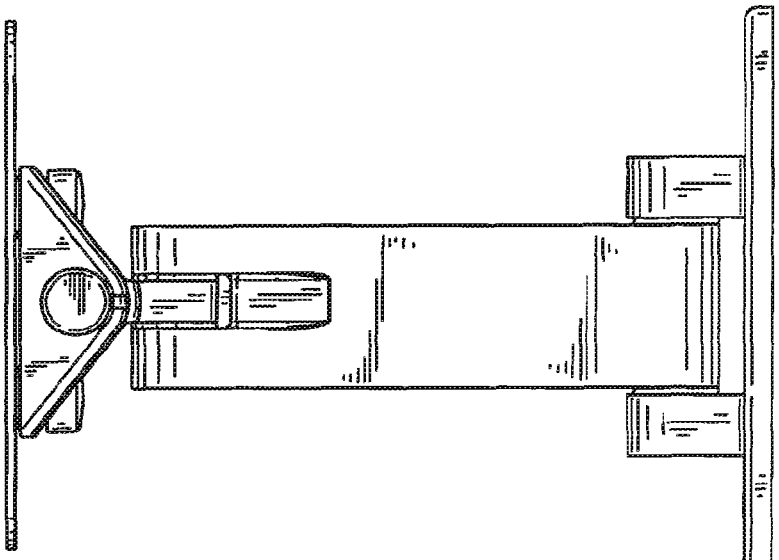
Figure 15:
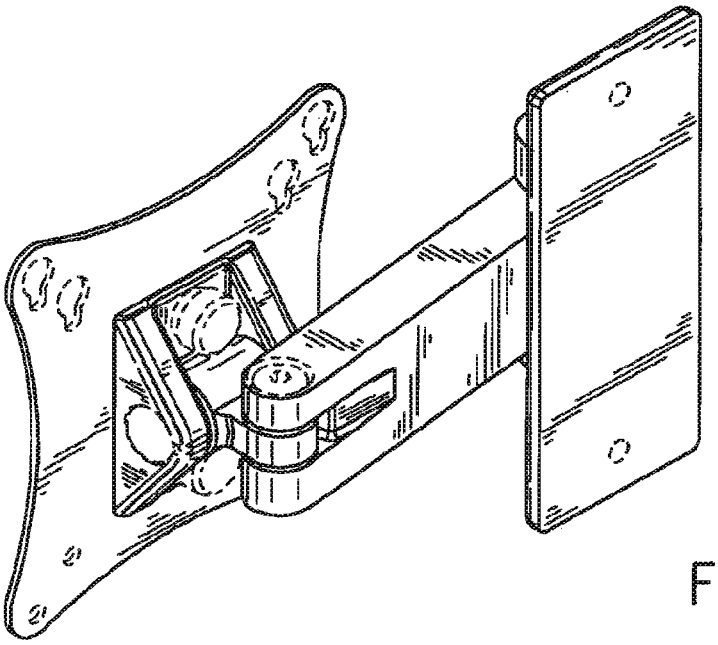
Figure 16:
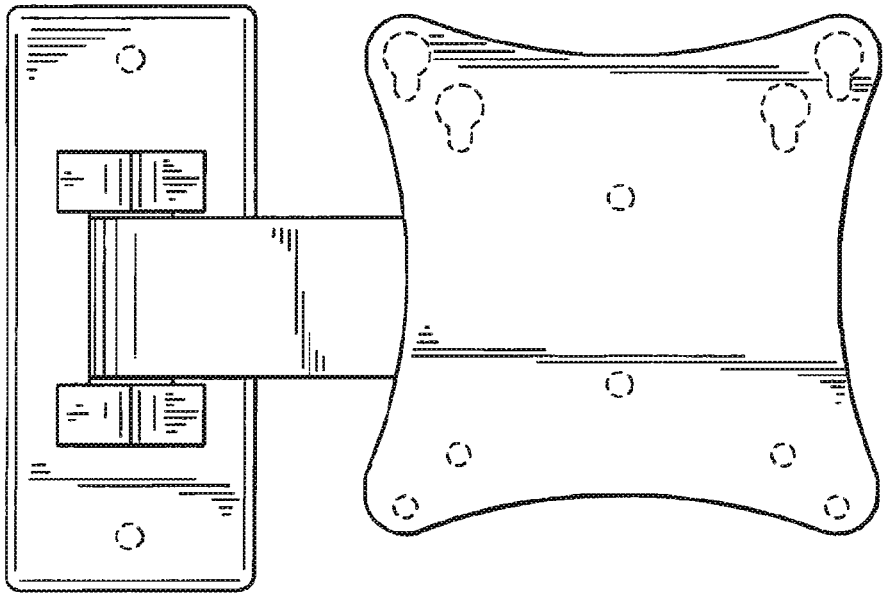
Figure 17:
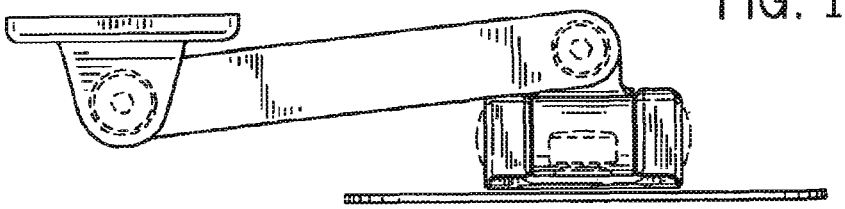
Figure 18:
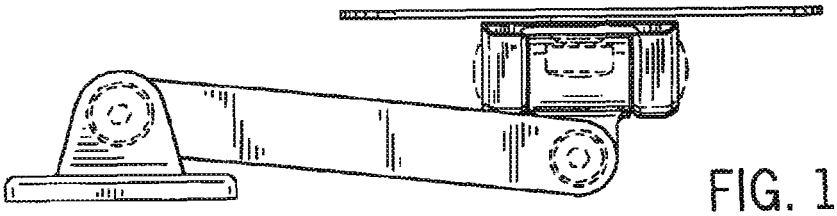
Figure 19:
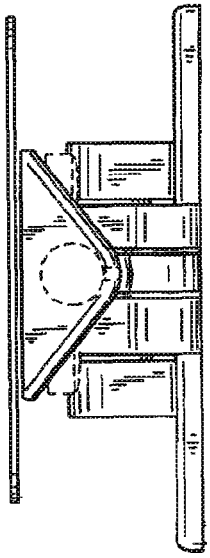
Figure 20:
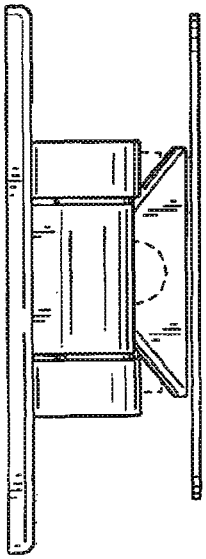
Figure 21:
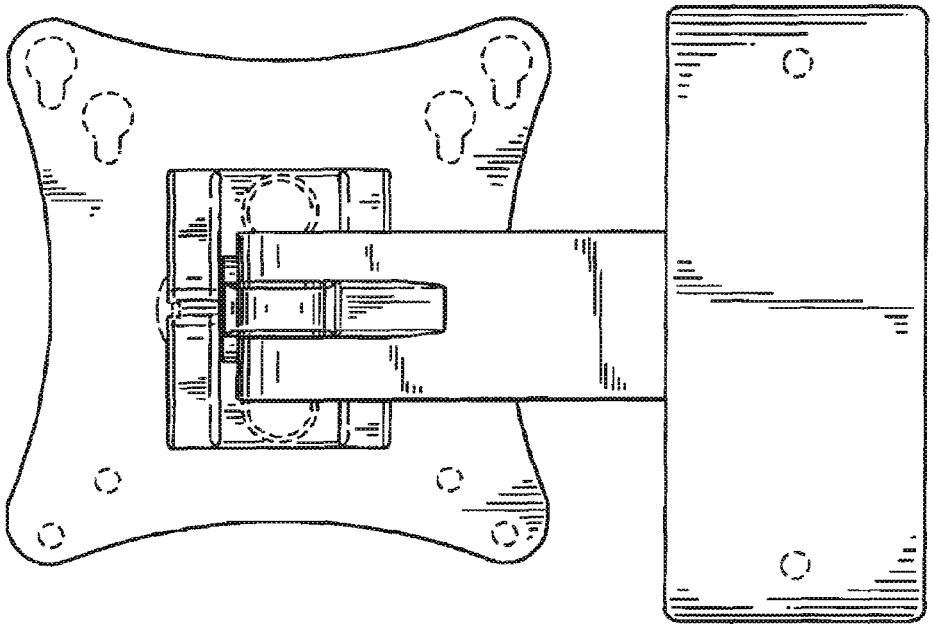
Figure 22:
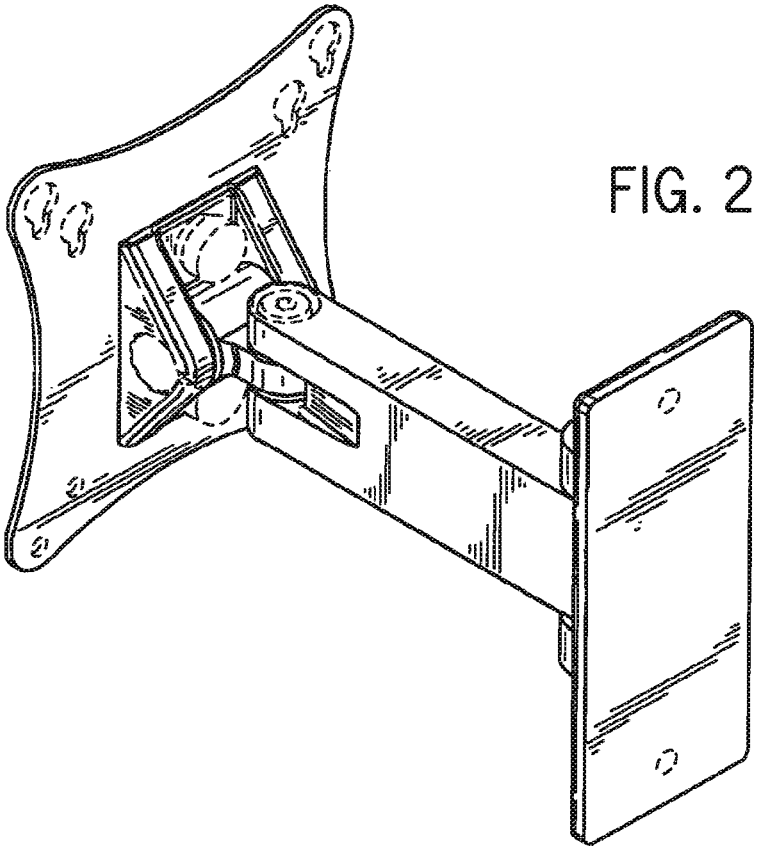
Figure 23:
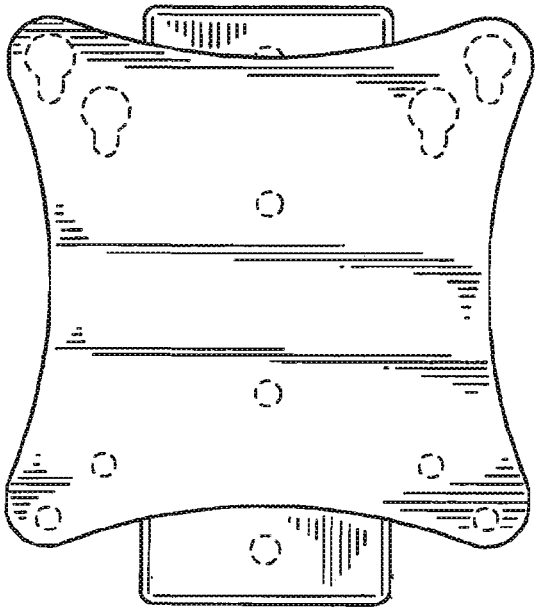
Figure 24:
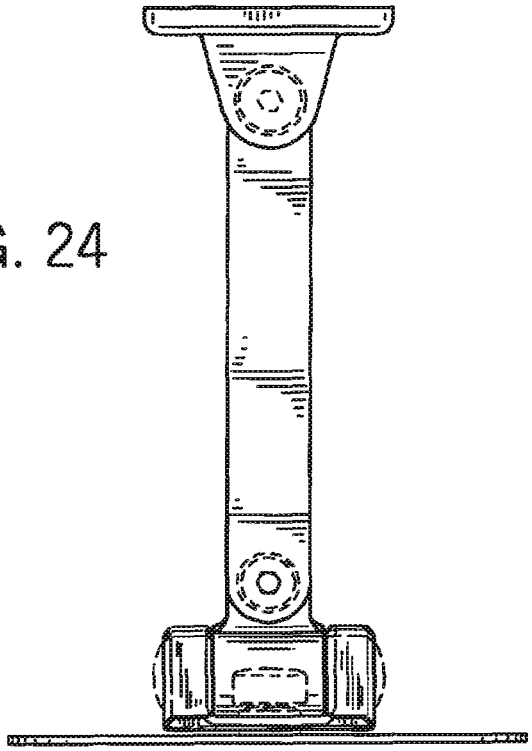
Figure 25:
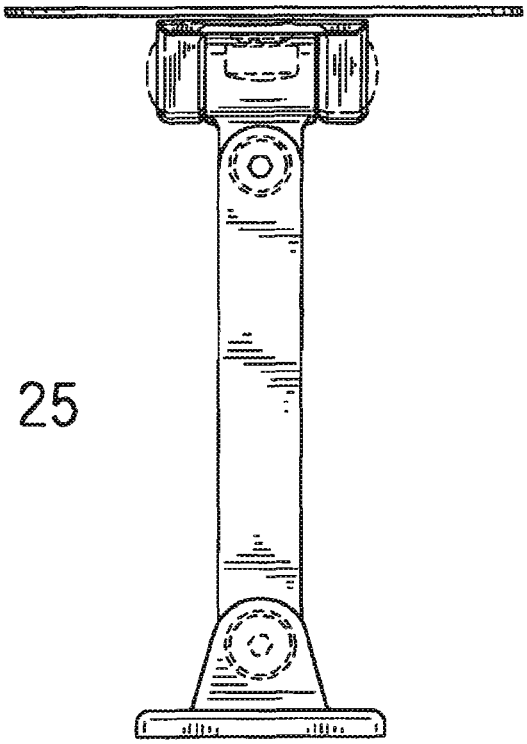
Figure 26:
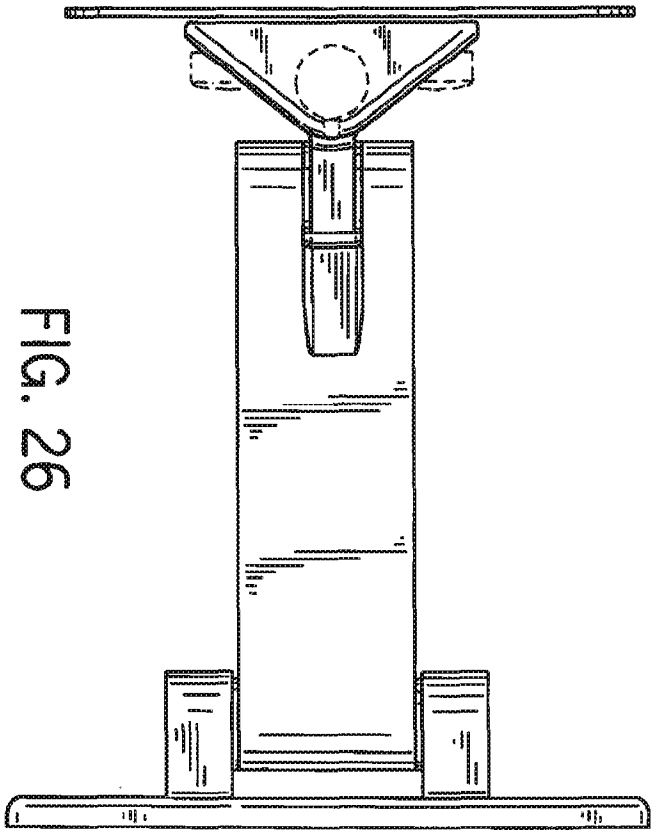
Figure 27:
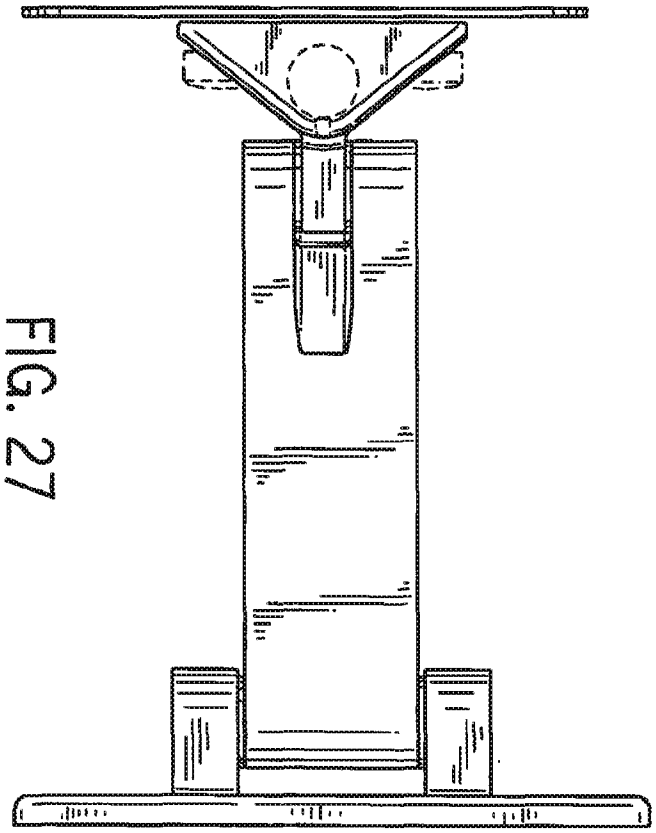
Figure 28:
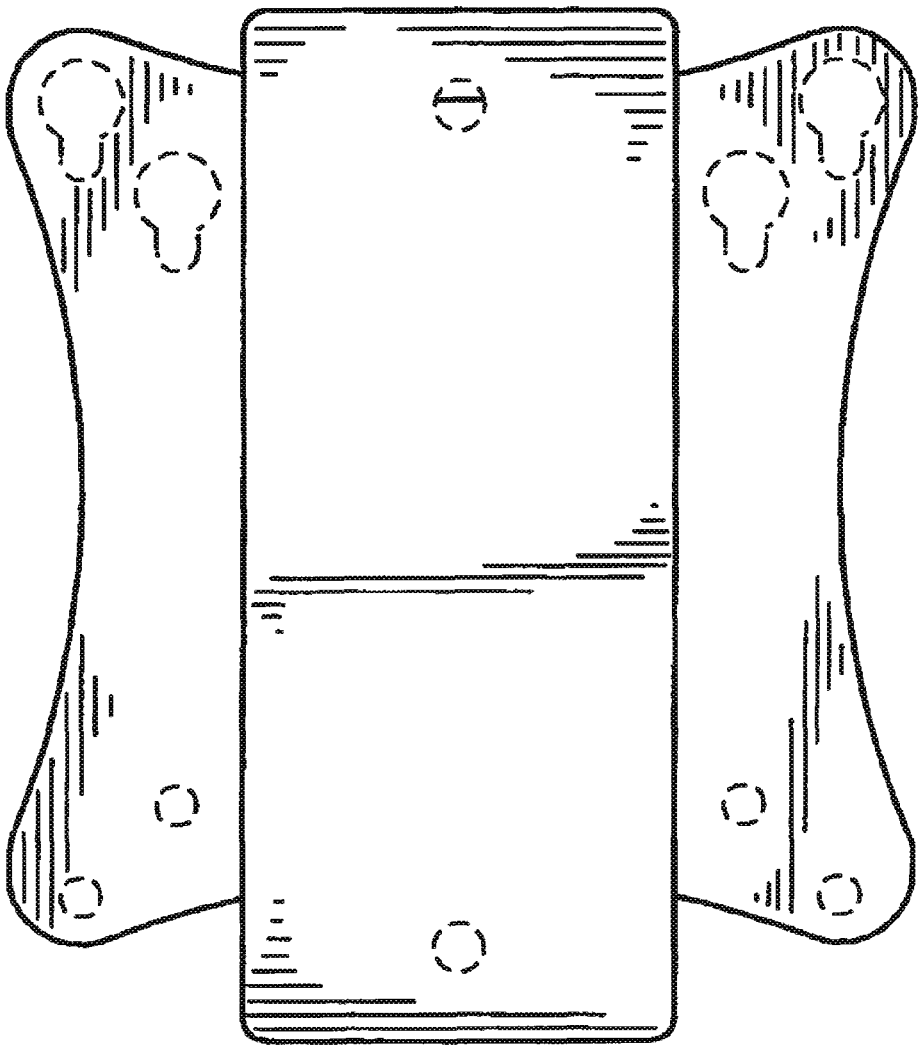

FIG. 1 is a perspective view showing a first position of the articulating mount showing my new design;
FIG. 2 is a front view thereof;
FIG. 3 is a top plan view thereof;
FIG. 4 is a bottom view thereof;
FIG. 5 is a right side view thereof;
FIG. 6 is a left side view thereof;
FIG. 7 is a rear view thereof;
FIG. 8 is a perspective view showing a second position of the articulating mount of FIG. 1;
FIG. 9 is a front view of the articulating mount in FIG. 8;
FIG. 10 is a top plan view of the articulating mount in FIG. 8;
FIG. 11 is a bottom view of the articulating mount in FIG. 8;
FIG. 12 is a right view of the articulating mount in FIG. 8;
FIG. 13 is a left side view of the articulating mount in FIG. 8; and
FIG. 14 is a rear view of the articulating mount in FIG. 8.
FIG. 15 is a perspective view showing a first position of another embodiment of the articulating mount showing my new design;
FIG. 16 is a front view of the articulating mount in FIG. 15;
FIG. 17 is a top plan view of the articulating mount in FIG. 15;
FIG. 18 is a bottom view of the articulating mount in FIG. 15;
FIG. 19 is a right side view of the articulating mount in FIG. 15;
FIG. 20 is a left side view of the articulating mount in FIG. 15; and
FIG. 21 is a rear view of the articulating mount in FIG. 15.
FIG. 22 is a perspective view showing a second position of the articulating mount of FIG. 15;
FIG. 23 is a front view of the articulating mount in FIG. 22;
FIG. 24 is a top plan view of the articulating mount in FIG. 22;
FIG. 25 is a bottom view of the articulating mount in FIG. 22;
FIG. 26 is a right view of the articulating mount in FIG. 22;
FIG. 27 is a left side view of the articulating mount in FIG. 22; and
FIG. 28 is a rear view of the articulating mount in FIG. 22.
*FIG. 29 is a perspective view of an articulating mount showing my new design;*
*FIG. 30 is a rear elevational view thereof;*
*FIG. 31 is a top plan view thereof;*
*FIG. 32 is a bottom plan view thereof;*
*FIG. 33 is a right side view thereof;*
*FIG. 34 is a left side view thereof; and,*
*FIG. 35 is a front elevational view thereof.*
The broken lines shown are for illustrative purposes only and form no part of the claimed design.

1 Claim, 16 Drawing Sheets

Matter enclosed in heavy brackets [ ] appears in the original patent but forms no part of this reissue; matter printed in italics indicates the additions made by reissue.

NEW

(56) References Cited

U.S. PATENT DOCUMENTS

| | | | | | |
|---|---|---|---|---|---|
| 5,751,548 | A | * | 5/1998 | Hall et al. | 361/686 |
| D426,142 | S | * | 6/2000 | Moore | D8/363 |
| 6,095,467 | A | * | 8/2000 | Neuhof | 248/278.1 |
| D455,949 | S | * | 4/2002 | Huang | D8/373 |
| 6,478,275 | B1 | * | 11/2002 | Huang | 248/284.1 |
| 6,554,238 | B1 | * | 4/2003 | Hibberd | 248/278.1 |
| 6,695,270 | B1 | * | 2/2004 | Smed | 248/274.1 |
| D488,708 | S | * | 4/2004 | Lam et al. | D8/363 |
| D489,599 | S | | 5/2004 | Lam | |
| D496,367 | S | * | 9/2004 | Pfister | D14/451 |
| D505,858 | S | | 6/2005 | O'Keene | |
| 6,905,101 | B1 | | 6/2005 | Dittmer | |
| D507,477 | S | | 7/2005 | Pfister | |
| 7,028,961 | B1 | | 4/2006 | Dittmer et al. | |
| D537,324 | S | * | 2/2007 | Worrall et al. | D8/363 |
| D552,455 | S | * | 10/2007 | Moore | D8/363 |
| D552,973 | S | * | 10/2007 | Hutchinson | D8/363 |
| D557,126 | S | * | 12/2007 | Worrall et al. | D8/380 |
| D595,723 | S | * | 7/2009 | Bures et al. | D14/451 |
| 2004/0245420 | A1 | | 12/2004 | Pfister et al. | |
| 2005/0263659 | A1 | | 12/2005 | Pfister et al. | |

* cited by examiner

FIG. 1
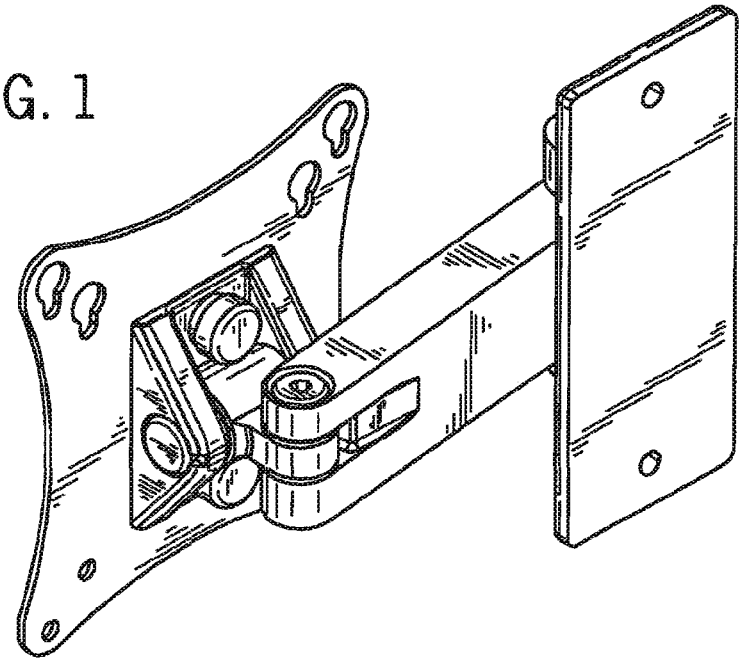
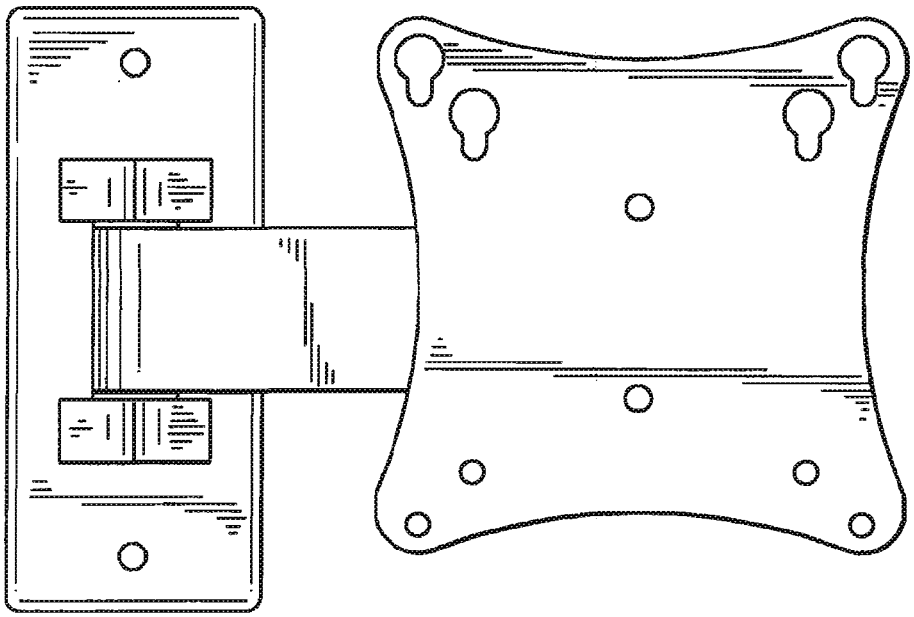
FIG. 2

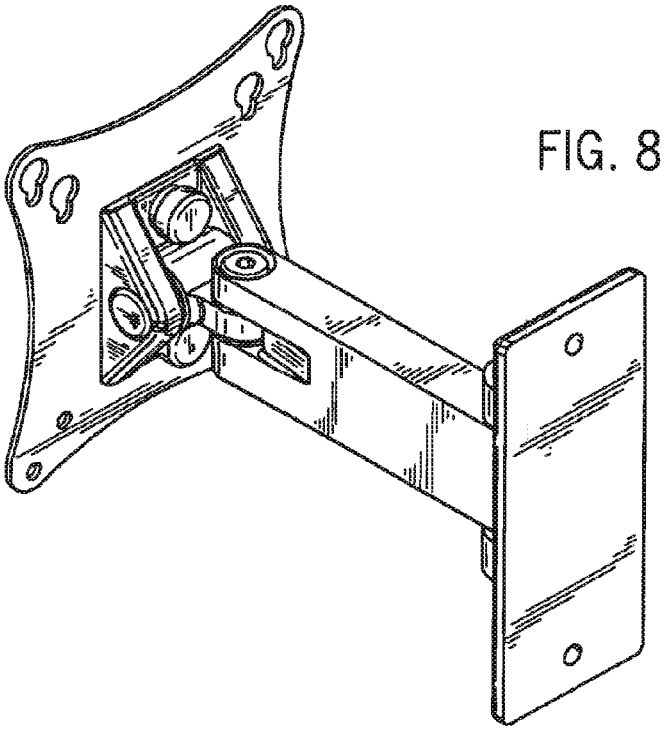
FIG. 8
FIG. 9
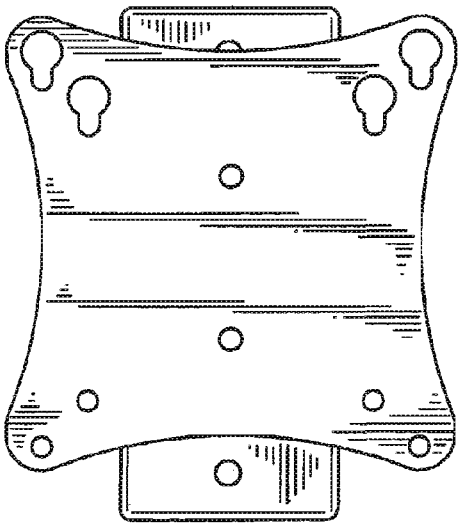
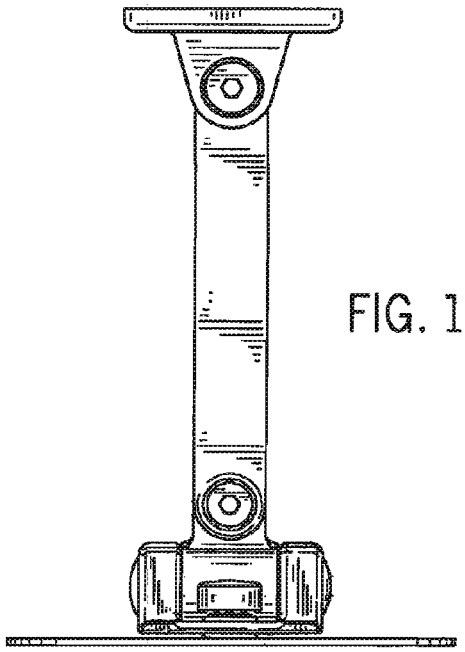
FIG. 10

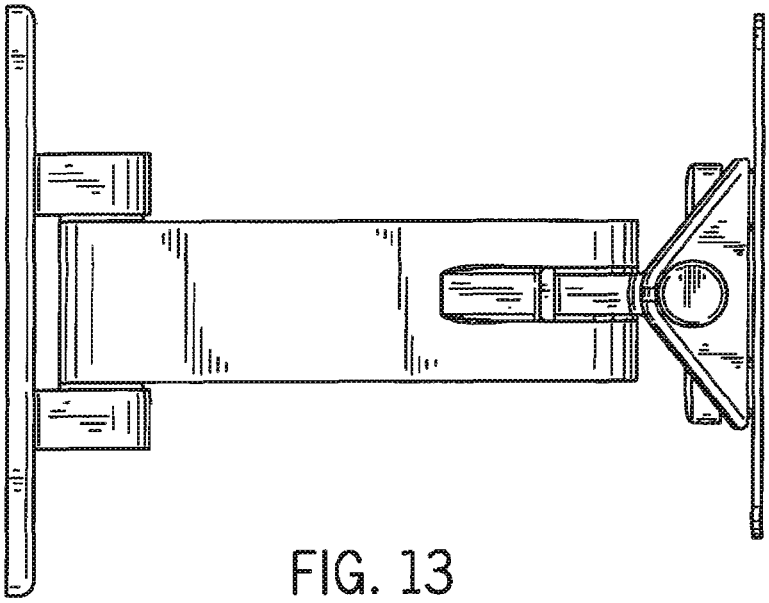
FIG. 13
FIG. 14
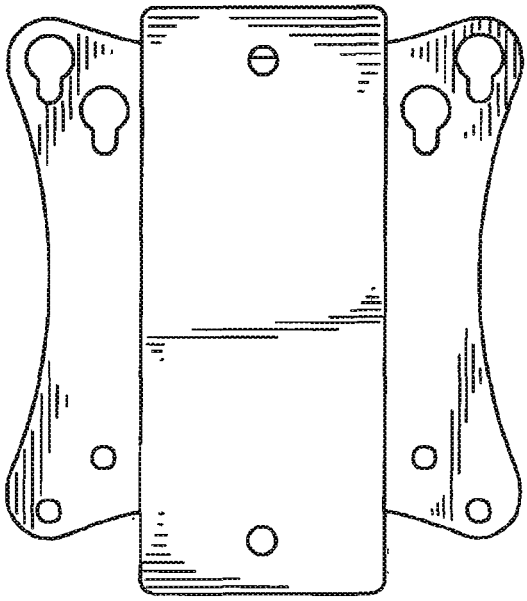

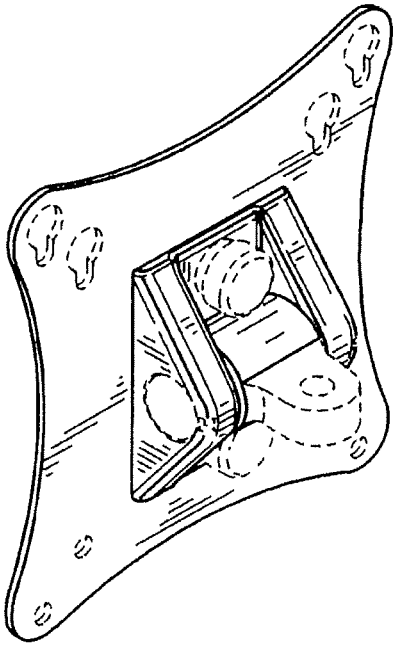
FIG. 29
NEW
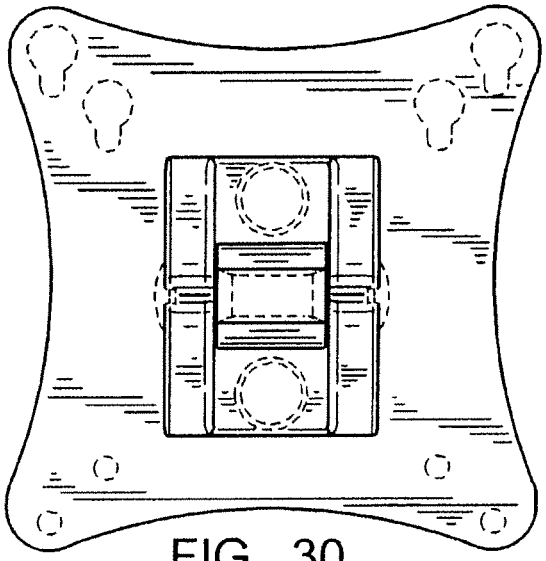
FIG. 30
NEW

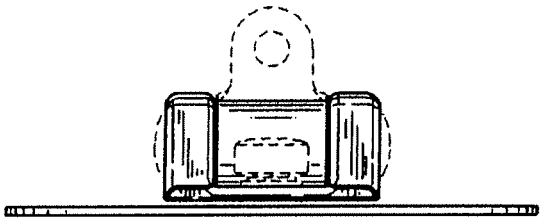
FIG. 31
NEW
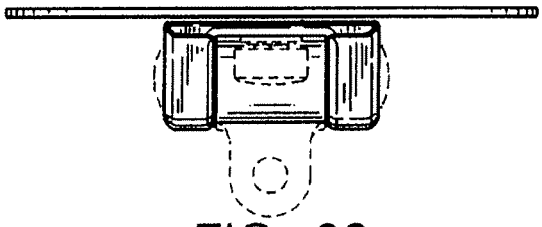
FIG. 32
NEW
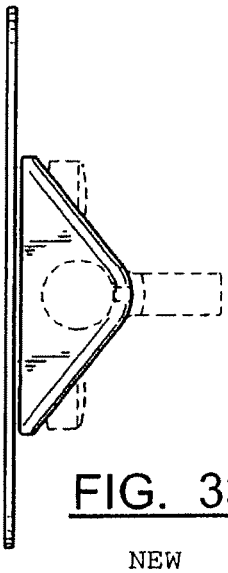
FIG. 33
NEW
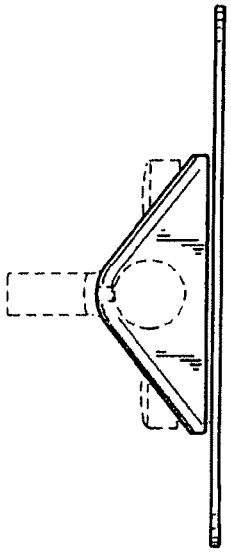
FIG. 34
NEW

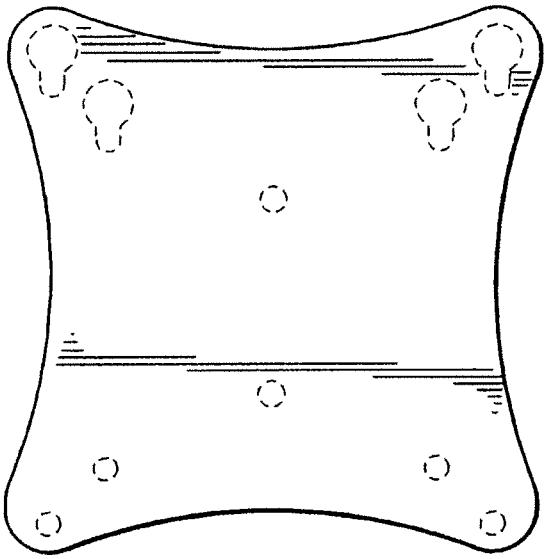
FIG. 35
NEW